J. A. COSTUMA.
PICTURE HOOK.
APPLICATION FILED FEB. 23, 1911.
1,025,964.
Patented May 14, 1912.
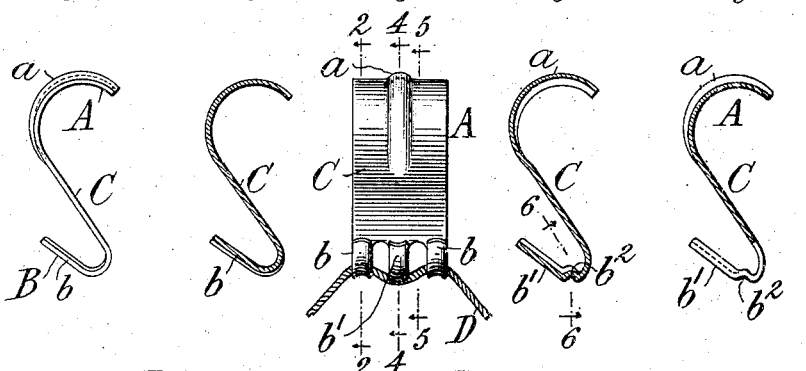

UNITED STATES PATENT OFFICE.

JACOB A. COSTUMA, OF NEW YORK, N. Y.

PICTURE-HOOK.

1,025,964.  Specification of Letters Patent.  Patented May 14, 1912.

Application filed February 23, 1911. Serial No. 610,254.

*To all whom it may concern:*

Be it known that I, JACOB A. COSTUMA, a citizen of the United States, residing in the borough of Manhattan, city, county, and State of New York, have invented certain new and useful Improvements in Picture-Hooks, of which the following is a specification.

My invention relates to picture hooks such as are employed for suspending pictures by a wire or cord from the molding of a room, and has for its object to provide means in such hooks to maintain the picture in the position to which it may be set and prevent it from easily tilting or becoming askew.

A further object of my invention is to accomplish the foregoing desirable purpose by a construction that shall not increase the expense of the picture hook, as this belongs to a class of objects which are sold for such a small price, that a construction which would measurably increase such price would to a large extent prevent the sale of the article.

Desirable ways of carrying my invention into effect are illustrated in the accompanying drawings, wherein,—

Figure 1 illustrates a side view of a picture hook containing my invention; Fig. 2 is a longitudinal section through one of the outer hooks of Fig. 3; Fig. 3 is a face view of said hook; Fig. 4 is a similar section to Fig. 2 on the line 4—4 of Fig. 3, taken through a central reinforcing bead on the molding hook, and through the inner picture hook; Fig. 5 is a view similar to Fig. 2 on the line 5—5 in Fig. 3; Fig. 6 illustrates the hook with the fingers cut off at the point of bend, and with a picture line or cord in position; Fig. 7 illustrates in side view a modified form wherein the hook is made of wire; Fig. 8 is a face view of a modified form showing the line or cord in position; and Fig. 9 is a perspective view thereof.

The preferred form of the invention is illustrated in Figs. 1 to 6. Here the hook is formed of a plate of sheet metal, as for instance brass, bent at its upper end to form a molding hook A, and at its lower end to form a picture hook B. The molding hook A may if desired be strengthened by a longitudinal bead $a$, which may begin at the free end of the hook and extend substantially around to the straight body portion of the hook C. The hook for the picture line or cord is digitated or formed into a plurality of fingers $b$ $b^1$. As illustrated, three of such fingers may well be employed, and I prefer to form them with their bend all in substantially the same plane, as thereby the symmetry of the hook is preserved, its appearance is improved, and the expense of production is not increased. The outer fingers $b$ as illustrated are bowed transversely so that their convex side is uppermost, and the inner finger $b^1$ is bowed in the opposite direction, so that its convex side is lowermost. This is to enable the picture cord to be held in position and to be capable of movement without danger of cutting. The said cord, which I designate D, is passed over the two outer fingers $b$ and under the inner finger $b^1$, and the said inner finger may well be provided with a notch $b^2$ for the purpose of guiding the said cord and retaining it in position. I have illustrated three fingers, which is a desirable number, and which are illustrated as of the same width, but obviously the number of fingers employed and their relative width is not essential. The width of the middle finger is immaterial, as it performs merely the function of kinking or bending the cord and preventing the same from slipping. When the picture is in place upon the cord and therefore the cord is under tension, it will be held in adjusted position, but may be easily moved to a fresh position by releasing the weight on the cord.

According to the modified form illustrated in Figs. 7, 8 and 9, the picture hook is formed of wire, three pieces being illustrated as being joined for this purpose. The said wires are illustrated as twisted together at their body portion E and bent at their upper end forming molding hooks F, and bent at their lower end to form picture hooks G. Each picture hook in this case is composed of two outer wires $f$ and an inner wire $f^1$, and this inner wire $f^1$ preferably has a notch or small bend at $f^2$ to guide the cord and hold the same in proper position. The wires may well be soldered together at some point in the body portion E to secure the same against slipping. The cord is applied in the same manner as in the preferred form.

I have illustrated the preferred manner of constructing my invention, and a desirable modification in which the invention may be embodied. Other changes however may be made in the construction of the said invention within the limits of the appended claims.

I claim as my invention:—

1. A picture hook formed of a plate of sheet metal and having a hook at one end for attachment to the molding and a hook at the other end for a picture wire or cord, said last-mentioned hook comprising three symmetrical, curved, rigid, hook-shaped fingers, each opening upwardly and having their portions at the point of bend in substantially the same plane and having their outer fingers convex on their upper surface and the inner finger convex on the lower surface, and formed with a guiding notch on the outside of its lower part, said fingers separated a sufficient extent to permit the passing of a wire or cord between them but permitting movement of the cord or wire relatively to the hook to adjust the same, whereby the wire or cord is held against accidental movement but may be moved relatively to the hook to adjust same.

2. A picture hook having a hook at one end for attachment to the molding and a hook at the other end for the picture wire or cord, said last-mentioned hook comprising a plurality of symmetrical, curved, rigid hook-shaped fingers coinciding in general curvature, and each opening upwardly and having their portions at the point of bend in substantially the same plane and having their outer fingers convex on their upper surface and the inner finger convex on the lower surface, and separated a sufficient extent to permit the passing of a wire or cord between them and lying closely enough together to form a substantially sharp bend in the wire or cord when in place, and to prevent movement thereof relatively to the hook but permitting movement of the cord or wire relatively to the hook to adjust same.

In witness whereof, I have hereunto signed my name in the presence of two subscribing witnesses.

JACOB A. COSTUMA.

Witnesses:
 HENRY M. TURK,
 THOMAS F. WALLACE.